United States Patent

[11] 3,600,010

| [72] | Inventors | George F. Downs, III<br>San Antonio, Tex.;<br>Burton Ver Nooy, Tulsa, Okla.; William R.<br>Gwartney, Jr., Houston, Tex. |
|---|---|---|
| [21] | Appl. No. | 811,762 |
| [22] | Filed | Apr. 1, 1969 |
| [45] | Patented | Aug. 17, 1971 |
| [73] | Assignee | T. D. Williamson Inc,<br>Tulsa, Okla. |

[54] PIPE COUPLING
2 Claims, 5 Drawing Figs.

[52] U.S. Cl. .................................................. 285/96,
285/103, 285/113, 285/286, 285/321, 285/351,
285/369
[51] Int. Cl. ..................................................... F16l 17/00
[50] Field of Search ........................................... 285/96,
103, 104, 105, 106, 321, 340, 113, 286, 369, 351

[56] References Cited
UNITED STATES PATENTS

| 3,420,554 | 1/1969 | Staub | 285/369 X |
|---|---|---|---|
| 239,827 | 4/1881 | Newman | 285/321 X |
| 1,898,623 | 2/1933 | Gammeter | 285/96 |
| 2,182,797 | 12/1939 | Dillon | 285/104 X |
| 2,635,901 | 4/1953 | Osborn | 285/105 X |
| 3,177,019 | 4/1965 | Osweiler | 285/321 X |
| 3,381,983 | 5/1968 | Hones | 285/321 |

FOREIGN PATENTS

| 237,391 | 12/1964 | Austria | 285/105 |
|---|---|---|---|
| 1,321,600 | 2/1963 | France | 285/106 |
| 6,706,494 | 11/1967 | Netherlands | 285/96 |

*Primary Examiner*—Dave W. Arola
*Attorney*—Hyer, Eickenroht, Thompson & Turner

ABSTRACT: The coupling disclosed includes a tubular housing for sliding over the adjacent ends of two pipe sections to be connected together. Two spaced annular portions of the inner surface of the housing are tapered to form two facing conically shaped cam surfaces. Gripping means are positioned between the inner surface of the housing and the pipe sections. The gripping means are moved inwardly into holding engagement with the pipe when they are moved axially along the cam surfaces. The gripping means are so moved by seal members, which in turn are operately moved axially by pressure from the line or an external source.

PATENTED AUG 17 1971

George F. Downs, III,
Burton VerNooy &
William R. Gwartney, Jr.
INVENTORS

BY Browning, Hyer,
Eickenroht & Thompson

ATTORNEYS

PATENTED AUG 17 1971 3,600,010

George F. Downs, III,
Burton VerNooy &
William R. Gwartney, Jr
INVENTORS

BY Browning, Hyer,
Eickenroht & Thompson
ATTORNEYS

PIPE COUPLING

This invention relates to a pipe coupling for connecting together two pipe sections.

The coupling of this invention can be used to connect any two pipe sections together, but is particularly well adapted to be used to repair leaking pipelines. Leaking pipelines are usually repaired by replacing the faulty section with a new one. Preferably, the new section is welded into the line. When the line is carrying volatile fluids, such as natural gas, liquid petroleum products, or crude oil, welding can be dangerous unless prior to welding, the flow of fluids in the line is stopped and the section to be repaired is washed clean of these volatile fluids. Often it is also necessary to clear the volatile fluids from the area around the leak before welding. This increases the length of time the line is shut down and the cost of repairing the line.

Therefore, it is an object of this invention to provide a pipe coupling that can connect a new section of pipe in a line and allow the line to be returned to service without requiring a welding operation. Later, after the area around the leak has been cleared of any volatile fluids that have leaked from the line during the repair and from the leak before it was repaired, what welding operations as may be desired can be carried out in complete safety.

It is a further object of this invention to provide a coupling for a pipeline that will connect two pipe sections together without requiring a threading operation or a welding operation.

It is a further object of this invention to provide a pipe coupling that will temporarily connect a new pipe section in a line to allow the line to be returned to service and which can be welded into the line after the surrounding area has been cleared of combustible fluids.

It is a further object of this invention to provide a pipe coupling having fluid-pressure-actuated pipe-gripping means for connecting two sections of pipe that can be connected to one of the pipe sections and then subsequently connected to the other to complete the connection of the two sections, thereby allowing the coupling to be connected to one pipe section at a place remote from the other, say above a body of water, after which the pipe section with the coupling attached can be moved into position to connect the coupling to the other section, say to the bottom of the water.

It is another object of this invention to provide a pipe coupling that has two separate fluid-pressure-actuated pipe-gripping means that can be separately actuated to thereby allow the fluid pressure used for actuating one of the pipe-gripping means to be independent of the pressure used to actuate the other pipe-gripping means.

These and other objects are accomplished in accordance with this invention by placing first and second pipe-gripping means in a housing for positioning each pipe-gripping means over one of the pipe sections to be connected. The housing has a cam surface associated with each pipe-gripping means to force the gripping means into holding engagement with the pipe sections when the gripping means are moved axially along the cam surface. Two spaced sealing elements are positioned in the housing adjacent each pipe-gripping means. With each pair, the sealing element adjacent the pipe-gripping means can move axially with the pipe-gripping means; the other sealing element can move only a limited distance away from the other. By applying fluid pressure separately between either pair of sealing elements, the pipe-gripping means associated therewith can be forced into holding engagement with a pipe section extending into the housing independently of the other pipe-gripping means. These and other objects, advantages, and features of this invention will be apparent to those skilled in the art from a consideration of this specification, including the attached drawings and appended claims.

The invention will now be described in connection with the attached drawings in which.

Figure 1:
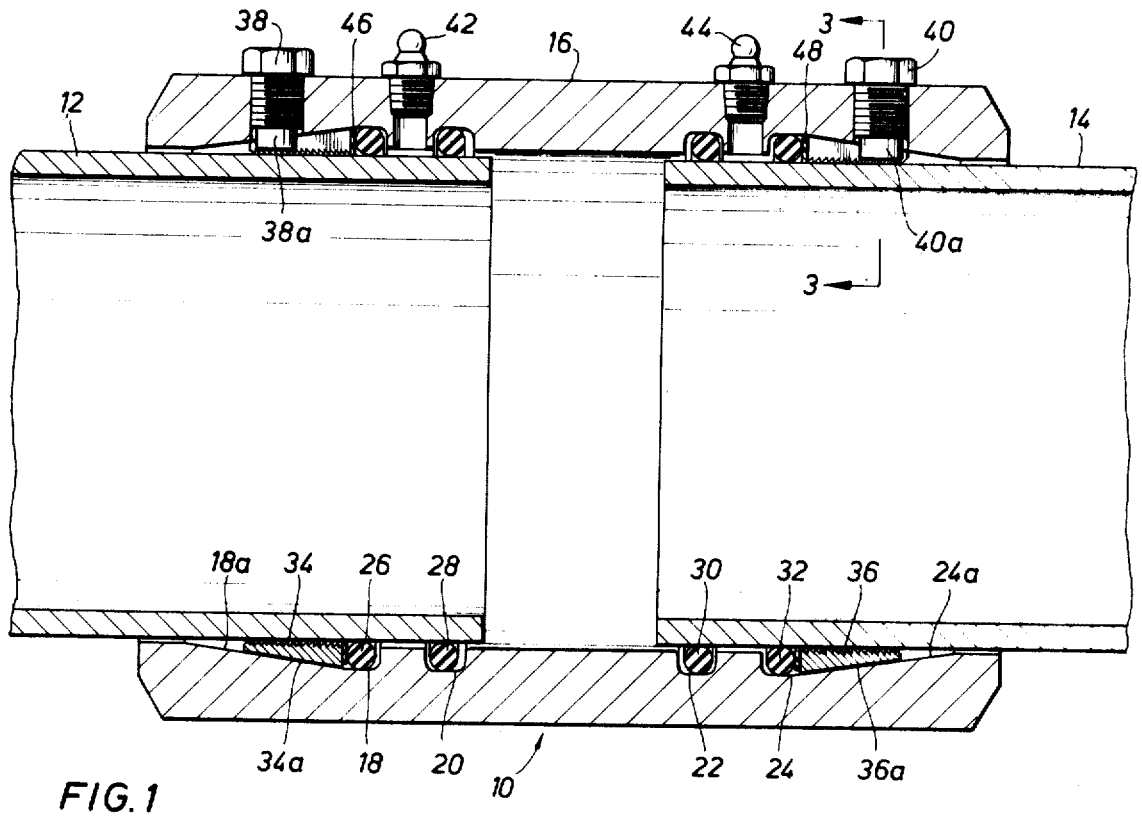
FIG. 1 is a vertical, cross-sectional view through the preferred embodiment of the pipe coupling of this invention showing the coupling installed over the ends of two pipe sections, but before the coupling is connected to the pipe sections.
Figure 4:
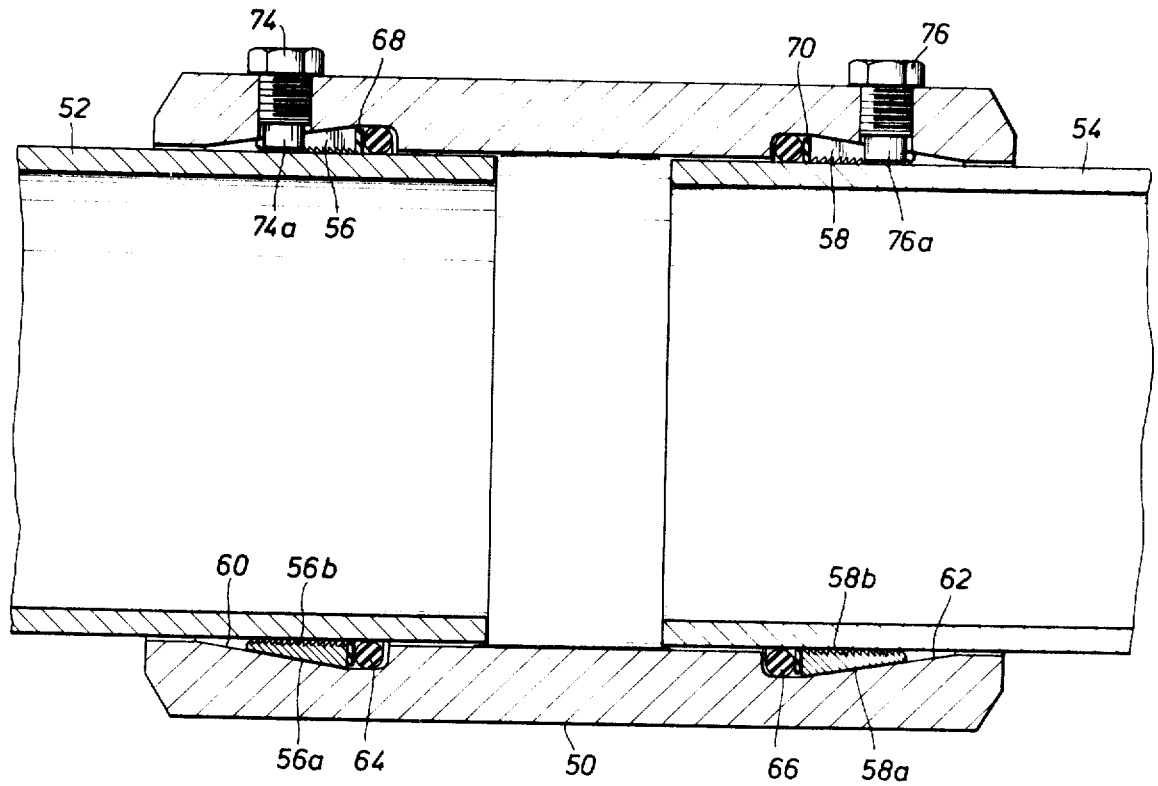
Figure 5:
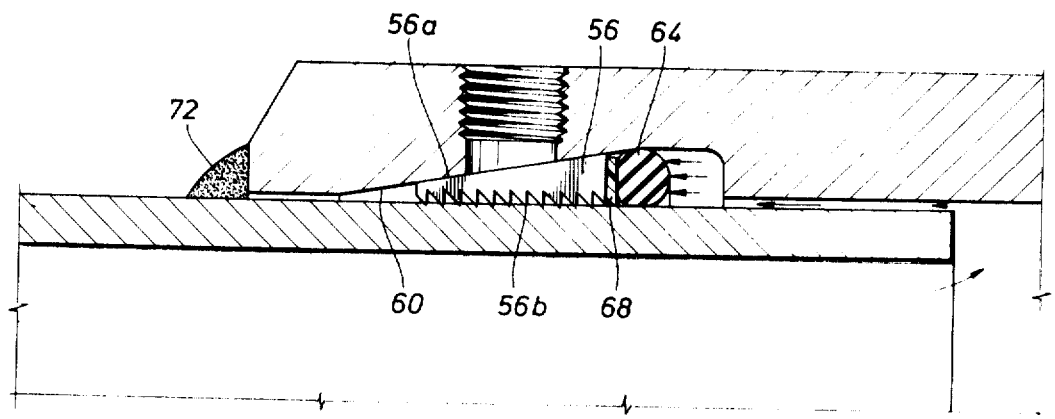

FIG. 4 is a cross-sectional view through an alternate embodiment of the coupling of this invention; and FIG. 5 is a sectional view on an enlarged scale of a portion of the coupling of FIG. 4. In FIG. 1, coupling 10 is shown installed over the adjacent ends of pipe sections 12 and 14. Coupling 10 includes tubular housing 16, which has an internal diameter such that it can be slid over the ends of pipe sections 12 and 14, as shown.

The housing has two pairs of internal annular grooves. The first pair are grooves 18 and 20; grooves 22 and 24 are the second pair. Located in these internal annular grooves are seal members, which in the embodiment shown are pressure-energized seal rings 26, 28, 30, and 32, respectively. The first pair, grooves 18 and 20, is located adjacent the external surface of pipe section 12. The second pair, grooves 22 and 24, is located adjacent the external surface of pipe section 14. The first groove of each pair, grooves 20 and 22, have sidewalls that limit the axial movement of seal rings 28 and 30 located therein. The second groove of each pair, grooves 18 and 24, have inwardly inclined sidewalls 18a and 24a, respectively. These inclined sidewalls form conically shaped cam surfaces that face toward the first groove of each pair and the ends of the pipe sections.

Figure 2:
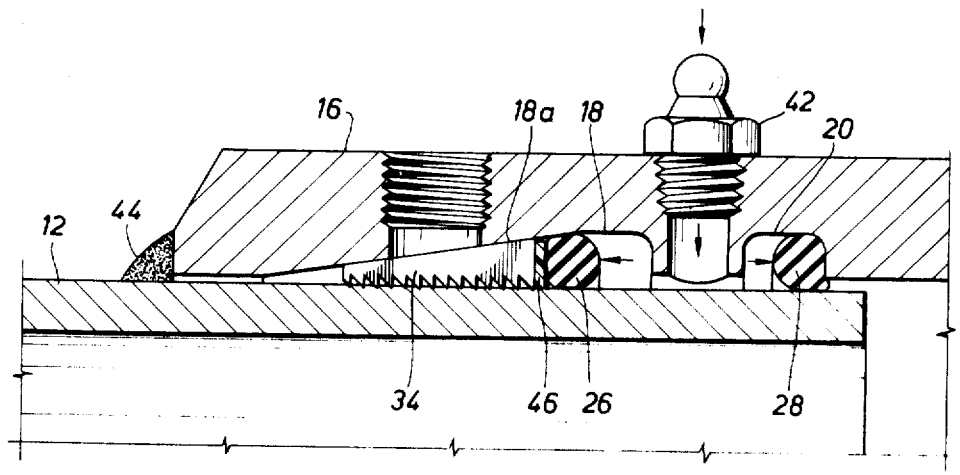
FIG. 2 is a fragmentary sectional view, on an enlarged scale, through a portion of the pipe coupling of FIG. 1 showing the coupling after it has been connected to the pipe sections.

Positioned in each of grooves 18 and 24 along with seal rings 26 and 32 are pipe-gripping means 34 and 36. Each of the pipe-gripping means have inclined outer surfaces 34a and 36a that engage the inclined cam surfaces of the groove in which they are located. Both gripping means are provided with teeth on their internal surface to engage the outside surfaces of pipe sections 12 and 14, when they are moved into engagement with them by axial movement along cam surfaces 18a and 24a, as shown in FIG. 2. These teeth bite into the outside surface of the pipe section and are designed to hold the pipe sections against axial movement out of the housing of the coupling.

The gripping means in the embodiment shown are split rings of resilient material, such as spring steel. Preferably, before being split, the rings have an internal diameter about equal to or slightly less than the outside diameter of the pipe the coupling is designed to connect.

Figure 3:
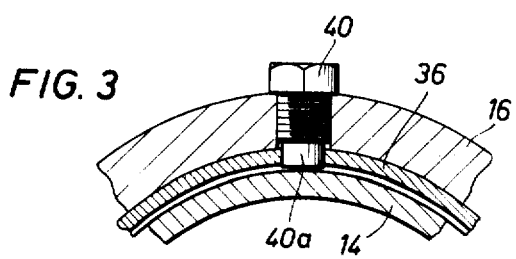
FIG. 3 is a fragmentary, sectional view taken along line 3—3 of FIG. 1.

So constructed, the toothed ring will tend to grab the pipe and move with it even before the ring has been wedged by one of the cam surfaces into holding engagement with the pipe. So that the coupling can be slid into position over the ends of the pipe sections without interference from the gripping means, the diameter of the split ring is increased by releasable means, located between the ends of the split ring, that force the ends apart far enough for the ring to clear the pipe. In the embodiment shown, pipe plugs 38 and 40 are located in tapped holes in housing 16. The plugs are located with their unthreaded ends 38a and 40 a located between the ends of split rings 34 and 36. Another view of plug 40 and ring 36 shown in FIG. 3. Once the coupling is in place, pipe plugs 38 and 40 are removed.

With the coupling in place over the adjacent ends of pipe sections 12 and 14 and pipe plugs 38 and 40 removed, means are provided for introducing pressure fluid between the seal rings of each pair of grooves to cause the seal rings in the second groove of each pair to move its adjacent gripping means toward the end of the coupling and along the conically shaped cam surface of the groove. This will force the gripping means into firm engagement with the outside surface of the pipe and anchor the coupling in place over the ends of the pipe.

In the embodiment shown, grease fittings 42 and 44 are located in tapped holes in housing 16 between the grooves of each pair. The grease fittings are of conventional design. They are equipped with a back pressure valve (not shown) that will hold whatever pressure is built up between the seal rings by the pressure fluid injected through the fitting. By using grease fittings, a hand-operated grease gun can be used in the field to separately inject grease into the annular space between the seal rings of each pair with sufficient pressure to move the gripping means into firm engagement with the pipe. For example, as shown in FIG. 2, the grease injected through grease fitting 42 has moved seal ring 26 axially and the seal ring has forced pipe-gripping means 34 along inclined surface 18a until the teeth of the gripping means are securely embedded in the outside surface of pipe section 12. Seal rings 28 and 30 in the first grooves of each pair prevent the grease injected between the seals from escaping into the pipeline.

With the coupling thus installed, the pipeline can be put back into service. The volatile fluids that escaped from the line while it was being repaired can now be cleaned up, allowed to dry up, or dissipated into the atmosphere. After a few days, depending upon the amount of contamination, the ends of the coupling can be safely welded to the pipe sections, as by weld 44 as shown in FIG. 2. Pipe plugs without end protrusions, like 38a and 40a of plugs 38 and 40, can be used to close the tapped holes from which these plugs were removed. The pipe plugs then can be welded to coupling 16 to ensure no leakage through them. Also, grease fittings 42 can be welded to the coupling and their ends closed by weld metal so that the seal rings will not be further depended upon to keep fluids from leaking from the pipeline.

Since there is a gap between the ends of the split rings used as gripping means, backup rings 46 and 48 are positioned between seal rings 26 and 32 and split gripping rings 34 and 36. These rings held keep the seal rings from being extruded through the split, when subjected to a high-differential pressure.

An alternate embodiment of the coupling of this invention is shown in FIGS. 4 and 5. The coupling includes tubular housing 50, which has an inside diameter sufficient to allow the coupling to be installed over the adjacent ends of pipe sections 52 and 54. First and second pipe-grippings means 56 and 58 are positioned for each of the gripping means to be located between the outer surface of a different one of the pipe sections and the inner surface of the housing, when the coupling is installed over the adjacent ends of two pipe sections, in the manner shown in FIG. 5. The pipe-gripping means of this embodiment are constructed in the same manner as those described above. They are split annular rings of resilient material, such as spring steel The outer surfaces 56a and 58a of the rings are conically shaped. The inner surface of both rings are provided with teeth 56b and 58b that will bite into the outer surface of pipe sections 52 and 54, respectively, and help anchor the pipe sections against axial movement out of housing 50.

First and second cam surfaces are provided on the inner surface of the housing to move the first and second gripping means radially into gripping engagement with the pipe sections as the gripping means are moved axially. In the embodiment shown, inwardly tapered annular surfaces 60 and 62 are located on the inner surface of housing 50 to encircle the outer surface of pipe sections 52 and 54, respectively, when the pipe sections are inserted into housing 50. Preferably, the taper of these surfaces is the same as the taper of outside surfaces 56a and 58a of gripping rings 56 and 58. Movement of each gripping ring axially of the coupling and toward the adjacent end of the coupling will cause the gripping ring to be wedged between cam surfaces 60 and 62 and the outside surface of pipe sections 52 and 54.

First and second sealing elements are located adjacent the first and second gripping rings, respectively, and on the opposite side thereof from the first and second cam surfaces. The sealing elements are also positioned to sealingly engage the inner surface of the housing and the outer surface of a different one of the pipe sections, when the coupling is installed over the adjacent ends of two pipe sections. So positioned the sealing elements will be moved axially by the pressure in the pipe sections and move the gripping rings axially along their respective cam surfaces. The sealing elements will move the gripping rings until they are firmly wedged between the cam surfaces and the pipe. When so wedged the gripping rings will hold the pipe sections against axial movement out of the housing. In the embodiment shown, seal rings 64 and 66 are positioned to so move gripping rings 56 and 58, when subjected to pipeline pressure. Backup rings 68 and 70 help keep the seal rings from being extruded into the gap between the ends of the split gripping rings.

After line pressure has set gripping rings 56 and 58, and seal rings 64 and 66 are holding line pressure from escaping from between the pipe and the coupling, the area around the line can be cleaned up or the volatile liquids allowed to dry up after which housing 50 can be welded to the pipe sections as by weld 72 in FIG. 5. Another similar weld made at the other end, of course.

Pipe plugs 74 and 76 are located in tapped holes in the side of housing 50. These plugs have unthreaded cylindrical ends 74a and 76a that extend into the gap between the ends of the split gripping rings and hold the ends of the gripping rings apart for enough to allow the coupling to be installed over the pipe sections. When installed these plugs are removed and the hole can be filled with a conventional pipe plug and welded closed, when the coupling is welded to the pipeline.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what we claim is:

1. A pipe coupling for connecting two pipe sections comprising, a tubular housing for sliding over the adjacent ends of two pipe sections, axially movable first and second pipe-gripping means positioned inside the housing to be located between the inner surface of the housing and the outer surface of the pipe section to be connected, when the coupling is installed over the adjacent ends of two pipe sections, each pipe-gripping means including a split ring of resilient material having teethlike projections on its inner surface, said ring before being split having an internal diameter approximately equal to or slightly less than the outside diameter of the pipe section the ring is to engage, and means for releasably holding the ends of the rings apart far enough to permit the coupling to be easily slid over the ends of adjacent pipe sections, first and second cam surfaces on the inner surfaces of the coupling for moving the first and second gripping means radially into gripping engagement with the pipe sections as they are moved axially of the housing, and means for so moving each pipe-gripping means comprising a pair of sealing elements located to be positioned between the gripping means and the end of the pipe section the means is to grip, on the opposite side thereof from the cam surface associated with the gripping means, and to sealingly engage the inner surface of the housing and the pipe section, and means for limiting the axial movement of the sealing elements of each pair that is closest to the end of the pipe section, said housing having an opening in its wall between the sealing elements of each pair to allow fluid under pressure to be separately injected between the sealing elements and move the sealing elements adjacent the gripping means axially which will move the gripping means along the cam surfaces and into holding engagement with the pipe sections.

2. A pipe coupling for connecting two pipe sections comprising, a tubular housing for sliding over the adjacent ends of two pipe sections, two pairs of internal grooves in said housing with an annular seal member located in each groove, each pair of grooves being located for positioning the seal members therein adjacent the outside surface of one of said pipe sections over which the housing extends, each pair of grooves including a first groove having sidewalls that limit the axial movement of the seal member located therein and a second groove located between the end of the housing and the first groove, said second groove having the side thereof adjacent the end of the housing inclined to provide a truncated conical surface facing toward the first groove, pipe-gripping means located in said groove between said inclined surface and the seal member in the groove, each pipe-gripping means including a split ring of resilient material having teethlike projections on its inner surface, said ring before being split having an internal diameter approximately equal to or slightly less than the outside diameter of the pipe section the ring is to engage, and means for releasably holding the ends of the rings apart far enough to permit the coupling to be easily slid over the ends of adjacent pipe sections, said pipe-gripping means being movable inwardly into pipe-gripping engagement with the outside surface of the pipe sections as the gripping means are moved axially away from the first groove along the inclined surface of the second groove, and means for admitting pressure fluid between each pair of grooves separately of the other pair to force the seal member in the second groove of said pair to move the gripping means along the inclined surface until said means grips the pipe section extending into that end of the coupling housing while the seal member in the first groove prevents the pressure fluid from escaping into the pipe sections.